Figure 1:
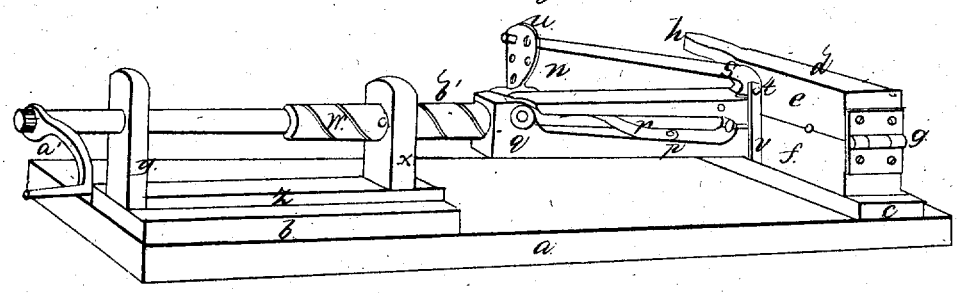
Figure 2:
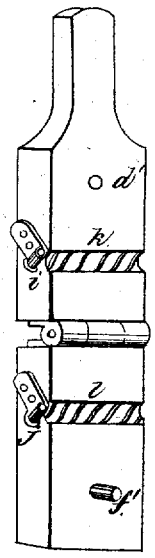

8196X

O. SNOW.

AUGER TWISTING MACHINE.

Patented May 13, 1834.

Oliver Snow, of Meriden, Conn^t.
Letters Patent

The schedule referred to in these Letters Patent and making part of the same contain-ing a description in the words of the said Oliver Snow himself, of his improvement called, "the Auger twisting machine": —

To all persons to whom these presents shall come: Know ye that I, Oliver Snow of Meriden, in the County of New Haven, State of Connecticut, a citizen of said State and of the United States, have invented made and applied to use a new and useful machine or improvement which I call "the auger twisting machine": and which I describe and specify as follows. - - -
This machine may be considered as comprising four parts. I. The bench to which the other parts of the machine are attached and which makes the whole portable. II. The die or mould in which the auger is twisted, and which is firmly fastened to the bench by nails screws or in any proper manner. —
III. The clamp or tongs which hold the shaft of the heated metal to be twis-ted. IV. The spiral screw, with its box and crank, supported by and work-ing in, two bearings which spring from a bed, and this bed and these bear-ings are also made fast in any thorough and proper manner to the bench.
1. The bench figure I. a, is composed of one or more pieces of any firm material such as plank or board, or cast iron plate, with or without block-ings as seen at b, and c, according to the height of the bearings which must be sufficient to enable the clamp or tongs to revolve without obstruc-tion. This bench with or without blockings is only for the purpose of a foundation for the other parts of the machine, and to keep these parts firmly in their proper relative position and make the whole portable.
2. The die or mould figure I, d, is made fast to the bench already described, and is formed of an upper and lower part, e, and f, connected with a hinges, g. The upper part has a handle h, for conveniently opening and closing the die in order to work the machine. This die must be so placed, that the centre of the opening in the same in which the spiral part of the auger is twisted, may be in a straight line with the center Drawing

3744 of the spiral screw, and that part of the clamp which holds the shank of the auger. The inner and back part of the die is exhibited in figure II. at i, and j, are two rollers placed in bearings made fast to the back part of the die by screws or other suitable means. These rollers are slightly hollowed in the middle and rounded at the ends, and are placed parallel to each other, and far enough apart to admit the flattened part of the heated metal freely to pass between them. – These rollers though not indispensible, are useful and help to accomplish two objects - one is to cause the heated metal to pass into the die with less friction and less danger of being left rough and broken, and the other, is to commence the work of shaping the spiral part of the auger. at k, and l, are exhibited the two parts of the die or mould which is principally operative in twisting the heated and flattened metal which forms the spiral part of instrument. This die when closed forms a hollow cylinder with a spiral thread sunk in the solid part of the surrounding metal, and so that the two edges of the flattened part of the heated metal are made to pass into and take the form of this sunken spiral thread. The die of mould should be made of hard and smooth metal and different dies for augers of different sizes will be necessary. If preferred these dies may be so formed as to be put in, and taken out of the large and solid part of the mass of metal exhibited in Fig. I. d. f. The parts are kept in place by a pin f. Fig. II. which enters a hole d. — 3. The clamp or tongs Fig. I. n, is composed of two bars o. p, moving on a pivot q. and caused to open with a spring r, and firmly closed by the pressure of a lever s. which turns on a pivot, t, and is fastened down by a moveable gripe u, with holes to receive the end of the lever. The larger end of the lever is so formed as to permit the bars as the lever is raised to be pressed open by the spring far enough to receive the shank of the auger. The band v. which passes round both bars and is made fast to the lower one enables the lever to govern and press together the jaws of the clamp and hold the shank firm. The clamp is made of iron and fastened by a screw to the spiral screw next to be described – 4. The spiral screw Figure I. w. works in the bearings x. y. which rise from a bed z. which is made fast in any suitable manner to the bench d.: at g. is a plain bearing for the smaller and plain or smooth part of the shaft to pass free throug, and at the end of this part is, the crank a, fastened on in the usual way. The spiral is either formed by either sinking a spiral thread as seen in b, working in a box c. with a male thread therein, or by raising a spiral threads on b, which would then work in a female spiral in the box c. The thread in the box c. may be formed by casting in lead or block tin around any portion of the shaft b. when in the box c. The spiral screw and the die must have the same curve or spiral, and they will of course govern the spiral screw which will be formed on the auger, the spiral screw b, must be as long at least as the spiral part of the auger, to be twisted. The size is not material except to give strength and firmness sufficient to twist the metal in the die. –

The use of the machine is easily understood from the description already given – The auger is first forged in the usual manner, until prepared for twisting. Then the die or mould being open, the clamp is brought near to one side of the die, the shank is laid in the hollow part of the die, with the flattened and heated end projecting beyond the opposite side of the die, the die is then firmly closed and the spiral screw being turned by the crank, the screw clamp, and auger to be twisted are made to revolve and thus the auger is drawn into the die and assumes the shape of the spiral in the die or mould into which it is drawn, and thus takes the desired form, and is then laid aside. The most important parts of the machine are the die or mould, and the spiral screw, and in the construction of the die, and the adaptation of the die and spiral screw to each other, the invention principally consists – The residue of the whole machine is principally useful in bringing these two parts into joint and successful operation –

I therefore claim as my invention the construction and use of the die or mould for twisting an auger or bit of any size as above described, and also the adaptation of the spiral screw to the die or mould and their joint use in the formation of the spiral part of an auger or bit as above described and specified. for the residue of the machine I make no claim.

In testimony, that the above and foregoing is a true description of my invention, I have hereunto set my hand at Meriden this sixteenth day of April in the year of our Lord one thousand eight hundred and thirty-four Witness John Allen Randolph Linsley Oliver Snow Exd

[1470 ...